United States Patent [19]

Kajiwara

[11] Patent Number: 5,166,533
[45] Date of Patent: Nov. 24, 1992

[54] TRIANGULATION TYPE DISTANCE SENSOR FOR MOVING OBJECTS WITH WINDOW FORMING MEANS

[75] Inventor: Yasuya Kajiwara, Himeji, Japan

[73] Assignee: Mitsubishi Denki K.K., Tokyo, Japan

[21] Appl. No.: 631,318

[22] Filed: Dec. 21, 1990

[30] Foreign Application Priority Data

Dec. 25, 1989 [JP] Japan .................................. 1-337890
Dec. 26, 1989 [JP] Japan .................................. 1-341427

[51] Int. Cl.$^5$ .......................................... G01N 21/86
[52] U.S. Cl. .......................................... 250/561; 356/4
[58] Field of Search ............... 250/201.8, 208.1, 561; 354/406, 407, 408; 340/716, 724, 731, 736; 356/1, 4

[56] References Cited

U.S. PATENT DOCUMENTS 4,749,848  6/1988  Sorimachi .
5,068,738  11/1991  Miida .............................. 250/201.8

FOREIGN PATENT DOCUMENTS 4006989  9/1990  Fed. Rep. of Germany .
61-139715  6/1986  Japan .
63-46363  9/1988  Japan .
2202104  9/1988  United Kingdom .

*Primary Examiner*—David C. Nelms
*Attorney, Agent, or Firm*—Sughrue, Mion, Zinn, Macpeak & Seas

[57] ABSTRACT

A distance sensor is disclosed composed of a pair of objective lenses 1 and 2 separated by a base length L, and a pair of two-dimensional image sensors 3 and 4. A left and a right image of a moving object 5, shifted from each other by a horizontal distance corresponding to a distance R to the object 5, is formed on the sensors 3 and 4. The left or the right image formed on the sensor is displayed on the display 11. A human operator initially sets, via the window forming device 12, the dimension and position of a window within the screen of the display. Thereafter, the microcomputer 10A samples at a predetermined sampling period the pixel signals of the image sensors 3 and 4, adjusts the dimension and the position of the window such that the window just covers the image of the object, and determines the amount of shift of the left and the right images on the basis of the image within the window.

7 Claims, 3 Drawing Sheets

TRIANGULATION TYPE DISTANCE SENSOR FOR MOVING OBJECTS WITH WINDOW FORMING MEANS

BACKGROUND OF THE INVENTION

This invention relates to triangulation type distance sensors utilizing image sensors, and more particularly to those suited for continuously measuring the distance to a moving object such as an automobile.

A typical organization of a triangulation type distance sensor utilizing image sensors is shown in FIG. 4, which is disclosed, for example, in Japanese Patent Publication (Kokoku) No. 63-46363 or Japanese Patent Laid-Open (Kokai) No. 61-139715. As shown in FIG. 4, the sensor comprises a pair of objective lenses 1 and 2 of a right and a left optical system separated from each other by a base length L. Image sensors 3 and 4, consisting, for example, of charged coupled devices (CCD), are positioned behind the lenses 1 and 2 respectively at the focal distance f. Thus, the object 5 at a distance R from the distance sensor forms a left and a right image on the image sensors 3 and 4, respectively. The analog signals outputted from the image sensors 3 and 4 are converted into corresponding digital signals via the A/D converters 6 and 7, respectively, and stored in the memories 8 and 9. It is noted that the images formed on the image sensors 3 and 4, and hence those stored in the memories 8 and 9, are displaced from each other by a horizontal distance corresponding to the distance R of the object 5 from the distance sensor. Thus, a microprocessor 10 determines the distance R on the basis of the information stored in the memories 8 and 9 as follows:

First, the microprocessor 10 calculates a first accumulated difference of the pixel signals of the left and the right image when the two images are superposed on each other without a shift. Thus, the microcomputer 10 first reads out from memory 8 a pixel signal corresponding to the pixel at the top left corner of the image sensor 3, and then from memory 9 a pixel signal corresponding to the pixel at the top left corner of the image sensor 4, and calculates the absolute value of the difference between the two pixel signals. Next, the microprocessor 10 reads out from memories 8 and 9 the pixel signals corresponding to the pixels at the right of the first pixels, calculates the absolute value of the difference therebetween, and accumulates the second absolute value with the first absolute value (i.e., calculates the sum of the two absolute values of the differences). The microprocessor 10 repeats the above operation until all the pixels of the image sensors 3 and 4 are processed successively, thereby obtaining a first accumulated value of the absolute differences. This first accumulated value represents the accumulated differences of the two images on the image sensors 3 and 4 when the two images are superposed on each other without a shift.

Next, the microprocessor 10 calculates a second accumulated difference of the pixel signals where the image on the sensor 4 is shifted to the right by one pixel pitch with respect to the left image formed on the sensor 3. Thus, the microprocessor 10 first reads out from memory 8 a pixel signal corresponding to the pixel at the top left corner of the image sensor 3, and then from memory 9 a pixel signal corresponding to the pixel at the right of the top left pixel of the image sensor 4, and calculates the absolute value of the difference between the two pixel signals. Next, the microprocessor 10 reads out from memories 8 and 9 the pixel signals corresponding to the pixels at the right of the first-read pixels, respectively, calculates the absolute value of the difference therebetween, and accumulates the second absolute value of the difference on the first absolute value. The operation is repeated until all the overlapping pixels of the two images are processed, thereby obtaining the second accumulated difference.

Further, the right image on the image sensor 4 is repeatedly shifted by one pixel each time with respect to the image on the image sensor 3, and accumulated differences of the two images are obtained after each shift. The magnitude of the shift at which the accumulated difference is at the minimum corresponds to the displacement of the two images on the sensors 3 and 4. If the shift of the right image with respect to the left is equal to n pixels and the horizontal pitch of the pixels is p, the displacement of the two images is equal to the product (n.p.). Thus, by the principle of triangulation, the distance R to the object 5 is obtained by:

$$R = f \cdot L / n \cdot p$$

where f is the focal length of the lenses 1 and 2 and L is the base length of the optical system.

The above conventional distance sensor, however, has the following disadvantage. The distance sensor is only capable of determining a distance to an object which lies in the direction of the optical axis of the sensor. Thus, in order to detect the distance to a moving object, it is necessary to direct the optical axis thereto. In the case of the conventional distance sensors, it is necessary to move the sensor in accordance with the moving object, which makes stable measurement of the distance difficult to perform.

SUMMARY OF THE INVENTION

It is therefore a primary object of this invention to provide a triangulation type distance sensor which is capable of continuously and stably determining the distance to a moving object provided the object is within the view field of the sensor.

An additional object of this invention is to provide a distance sensor by which even if the picture of a moving object is lost momentarily, the distance to the object can again be continuously determined from the moment when the picture of the object is captured again.

The first object is accomplished in accordance with the principle of this invention by a distance sensor which comprises: two-dimensional image sensor means; optical means for forming on said image sensor means a first and a second image of an object a distance to which is to be measured, wherein said first and second images are shifted from each other by a magnitude of shift corresponding to the distance to said object; display means, coupled to said image sensor means, for displaying at least one of the first and second images; window forming means via which a human operator sets an initial window region within a screen of the image displayed on said display means, said initial window covering an image of the object; and control means for sampling pixel signals of said image sensor means at a predetermined sampling period, successively adjusting at each sampling time point within said screen a position and a dimension of a current window region in accordance with the sampled pixel signals, and determining at each sampling time point, based on an image within said window region, said magnitude of shift between the first and second images and, in accordance therewith, the distance to said object by means of the principle of triangulation.

Prefereably, said control means adjusts at each sampling time point the dimension of the current window region in inverse proportion to a latest measured distance to the object, and the position of the current window region within said screen at a location where an image within a window region at a preceding sampling time point best agrees with an image within a new current window region. More specifically, said control means selects at each sampling time point an enlarged region which enlarges a preceding window region by a predetermined amount or ratio, shifts successively with respect to said enlarged region, one pixel at a time, the window region of the preceding sampling time point, calculates at each shift a sum of differences of overlapping pixel signals, and selects a new current position of the window region at a location where said sum of the differences of the overlapping pixel signals is minimized.

The second object is accomplished in accordance with the principle of this invention by which when, at a sampling time point t1, a difference between a maximum and a minimum of said sum of differences of overlapping pixel signals calculated at each shift is less than a predetermined level, said control means neglects pixel signals sampled at said time point t1, and, at a time point t2 succeeding said time point t1, selects a new current window region in accordance with a window region selected at a latest sampling time point t0 before said time point t1 at which said difference between the maximum and the minimum of the sum of overlapping pixel signals calculated at each shift is not less than said predetermined level. Prefereably, when said difference between the maximum and the minimum of the sum of overlapping pixel signals calculated at each shift is less than said predetermined level for a predetermined length of time, said control means stops adjusting the window region and determining the distance to the object.

BRIEF DESCRIPTION OF THE DRAWINGS

The novel features which are believed to be characteristic of this invention are set forth with particularity in the appended claims. This invention itself, however, both as to its organization and method of operation, together with further objects and advantages thereof, may best be understood from the following detailed description of the preferred embodiment, taken in connection with the accompanying drawings, in which:

In the drawings, like reference numerals represent like or corresponding parts.

DETAILED DESCRIPTION OF THE PREFERRED EMBODIMENT

Referring now to accompanying drawings, distance sensor according to an embodiment of this invention is described. The sensor is suited to be installed on an automobile for the purpose of measuring the distance to another automobile, etc., running in front of it.

Figure 4:
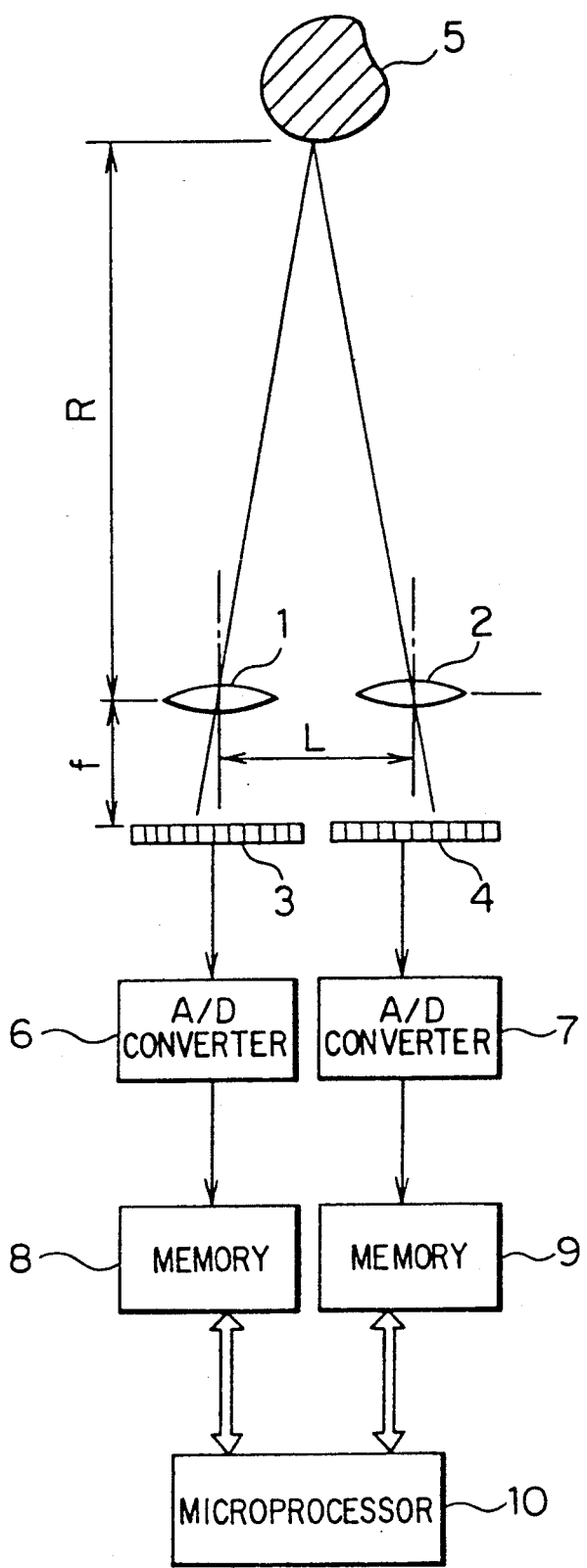
FIG. 4 is a block diagram showing the overall organization of a conventional distance sensor.

The parts designated by reference numerals 1 through 9 are similar to those shown in FIG. 4 and described above. Thus, a pair of objective lenses 1 and 2 of a right and a left optical system are separated from each other by a base length L. Two-dimensional image sensors 3 and 4, comprising a two-dimensional array of pixels, are positioned behind the lenses 1 and 2 respectively at the focal distance f. Thus, the object 5 at a distance R from the distance sensor forms a left and a right image on the image sensors 3 and 4, respectively. The analog signals outputted from the image sensors 3 and 4 are converted into corresponding digital signals via the A/D converter 6 and 7, respectively, and stored in the memories 8 and 9. Further, a microcomputer 10A processes the image data stored in memories 8 and 9 and displays them on the display 11. The display 11 is controlled by the microcomputer 10A. A window forming device 12, coupled to the microcomputer 10A, forms a window (a marked sub-area) within the screen of the display. A human operator can set the position and the dimension of the window while observing the screen of the display 11.

The method of operation of the microcomputer 10A, the display 11, and the window forming device 12 is as follows.

Since the optical axes of the objective lenses 1 and 2 are separated by a horizontal distance L, the left and the right image of the object 5 (e.g., an automobile running ahead) formed on the image sensors 3 and 4 are displaced from each other by a horizontal shift inversely proportional to the distance R to the object 5. Namely, the left image formed on the image sensor 3 is displaced to the left of the optical axis of the lens 1, while the right image formed on the image sensor 4 is displaced to the right of the optical axis of the lens 2. The displacements or shifts are inversely proportional to the distance R.

Figure 1:
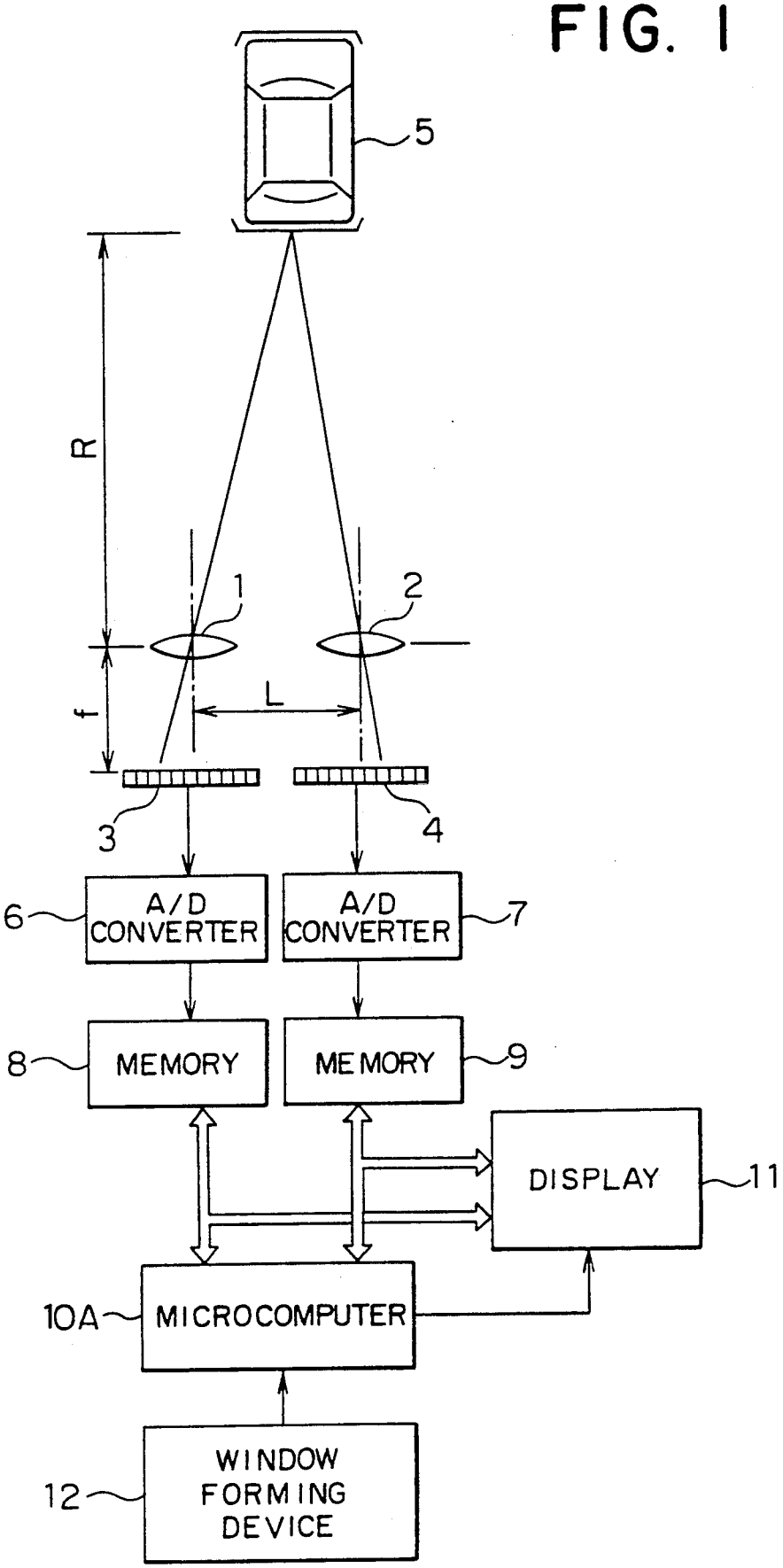
FIG. 1 is a block diagram showing the overall organization of a distance sensor according to this invention.
Figure 2A:
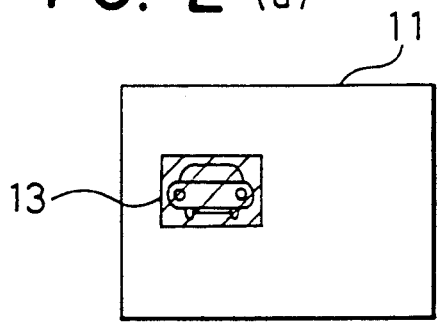
FIGS. 2(a) and 2(b) shows the window region and the comparison region of the left and the right screen images.
Figure 2B:
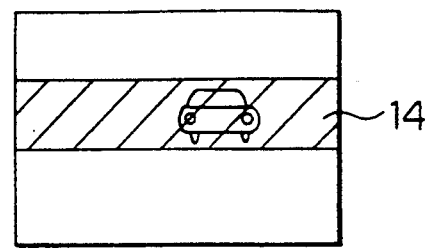

First, the left image obtained via the image sensor 3, for example, is displayed on the display 11 as shown in FIG. 2 (a). This is effected by the microcomputer 10A by reading out the pixel signals successively from the memory 8 and displaying the corresponding picture on the display 11. Then, the human operator operates the window forming device 12 to form an appropriate window (marked area) 13 covering the object (e.g., an automobile moving ahead) the distance to which is to be measured. The microcomputer 10A reads in the information with respect to the position and dimension of the window 13 and thereby determines which portion of pixel signals of the memory 8 is to be used as a basis for the determination of the distance R to the object 5. The microcomputer 10A thus selects comparison regions within the memories 8 and 9, corresponding respectively to the window region 13 of the left image and a comparison region 14 of the right image as shown in FIG. 2 (b). The comparison region 14 of the right image obtained by the image sensor 4 contains the image of the object 5. Further, the microcomputer 10A successively shifts the pixel signals of the right image each time by one pixel with respect to the pixel signals of the left reference image, and calculates at each shift the sum of the differences of the respective overlapping pixels. (More pictorially, this operation may be summarized as follows: The window portion 13 of the left image, as shown in FIG. 2 (a), is successively shifted one pixel at a time from the left to right end of the horizontally elongated comparison region 14 of the right image, and the sum of the absolute values of the differences of the overlapping pixels of the two images are calculated at each shift.) The microcomputer 10A then determines the amount of shift which minimizes the sum of the absolute differences of the pixel signals as calculated above. If the amount of shift which minimizes the sum of the pixel differences is equal to n pixels and the horizontal pixel pitch is equal to p, the distance R to the object 5 can be obtained, on the basis of the principle of triangulation, by the following equation:

$R = f \cdot L / n \cdot p$ where L is the base length of the optical systems formed by the lenses 1 and 2, and f is the focal length of the lenses 1 and 2.

Thereafter, the microcomputer 10A samples the pixel signals at a predetermined sampling period, automatically adjusts the dimension and position of the window of the left image and the comparison area of the right image, and successively and continuously determines the distance to the object 5. This is effected as follows.

Figure 3A:
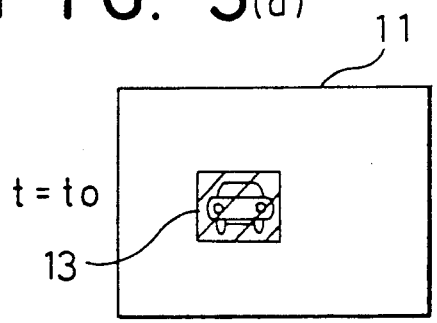
FIGS. 3(a)–3(c) shows several screen images illustrating the method by which window regions and comparison regions are adjusted at each sampling time according to this invention.
Figure 3B:
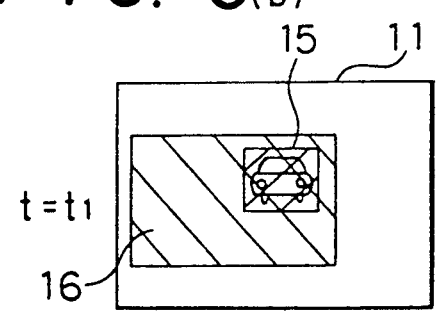
Figure 3C:
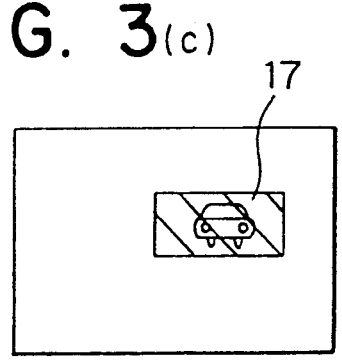

After a predetermined short sampling period, the object 5 moves relative to the distance sensor, and thus the images formed on the image sensors 3 and 4 move to positions different from those at the preceding sampling time. FIG. 3 (a) shows the window 13 formed within the screen of the display 11 at a first time point t0. At a sampling time point t1 after a predetermined sampling period thereafter, the object 5 moves to a different position within the screen as shown in FIG. 3 (b). Thus, as shown in FIG. 3 (b), the microcomputer 10A first selects, at time point t1, within the screen 11 an enlarged comparison region 16, which enlarges by a predetermined amount or ratio the window region 13 at the preceding time point t0. Further, the microcomputer 10A successively shifts one pixel at a time within and with respect to the enlarged comparison region 16 the image of the previous window region 13, and calculates at each shift the sum of the absolute values of the differences of the overlapping pixel signals. The sum of the absolute differences is minimized when the preceding window region 13 is positioned on a region 15 covering the object 5 as shown in FIG. 3 (b). Thus, the microcomputer 10A selects as the position of the new window the location 15 at which the sum of the absolute differences of the overlapping pixels is minimized.

The dimension of the new window 15 is determined by the microcomptuer 10A as follows. The dimensions of the images of the object 5 on the image sensors 3 and 4 are inversely proportional to the distance R of the object 5 from the distance sensor. Thus, the dimension of the window 15 should be varied inversely proportionally to the distance R. However, since the time interval between the time points t0 and t1 is short, the variation of the distance R to the object 5 is negligibly small. Thus, at the first time point t1 after the initial time point t0, the dimension of the window may be set equal to that of the window 13 set at the time point t0 at which the pursuit of the object 5 is started. On the other hand, at a time point ts at which the latest measured distance Rs to the object 5 is different from the initial distance R0 thereto, the dimensions of the sides of the window 15 is set R0/Rs times to those of the initial window 13.

After the window region 15 of the left image is thus selected, the microcomputer 10A further selects, as shown in FIG. 3 (c), the image comparison region 17 of the right image obtained via the image sensor 4, and shifts successively with respect to the pixel signals of the window 15 the pixel signals of the comparison region 17 one pixel at a time, calculating the sum of the absolute differences of the overlapping pixel signals before each shift. This is equivalent to shifting the window region 15 over the comparison region 17 from the left to the right end thereof one pixel at a time, and calculating at each shift the sum of the absolute differences of the overlapping pixels. From the amount of shift n1 which minimizes the sum of the absolute differences of the pixels, the distance R to the object at the sampling time point t1 is calculated, as described above, by the following equation:

$R = f \cdot L / n1 \cdot p,$ where f, L, and p are as described above. In this connection, it is noted that since the variation of the distance R to the object 5 is negligibly small during two successive sampling time points (e.g., t0 and t1), the horizontal width of the comparison region 17 of the right image over which the comparison is made at current time (e.g., t1) may be limited to a neighborhood of the position at which the sum of the absolute differences of the pixels has been minimized at the preceding time point (e.g., t0).

In the case where the distance sensor is installed on an automobile and the distance to a moving object is measured therefrom, exterior disturbances may interfere with the images of the object 5 on the image sensors 3 and 4. For example, an image of a window wiper of the automobile may enter into the picture, or an image of a bird may cross the view. Further, when the object (e.g. an automobile) comes under the shadow of a land bridge, etc., the picture is almost totally blurred. At such sampling time points, even when the preceding window is shifted successively within the enlarged region 16 as described above, the sum of the absolute differences of the overlapping pixel signals hardly varies over successive shifts and thus the difference between the maximum and the minimum value of the sum becomes small, thereby making it difficult to determine the minimizing overlapping position. Thus, preferably, the microcomputer 10A judges that an external disturbance is present at time point t1 when the difference between the maximum and the minimum values of the sum of the absolute differences of the overlapping pixels is less than a predetermined level, and the microcomputer 10A disregards and neglects the pixel signals obtained at the sampling time point t1. At the succeeding sampling time point t2, the dimension and the position of the window 15, etc., at the time point t0 immediately before the time point t1 are utilized as the reference for determining those at the current time point t2. If an external disturbance is still present at time point t2, the pixel signals obtained at the time point t2 are also disregarded and neglected by the microcomputer 10A, and the signals at the time point t0 are taken as references at the time point t3 immediately after the time point t2. This is repeated until the external disturbance is removed. However, when such disregarded sampling time points repeat themselves over long time interval, the picture of the object 5 on the image sensors 3 and 4 may become completely changed or even lost. Thus, if an external disturbance is present (i.e., the differene between the maximum and the minimum of the sum of the absolute differences of the overlapping pixel signals is smaller than the predetermined magnitude) throughout a predetermined time interval (which is preferred to be determined in accordance with the velocity of the automobile), the automatic pursuit of the object 5 or window adjustment and the determination of the distance R thereto by the microcomputer 10A are preferred to be terminated.

It should be noted that in the case of the above embodiment, the distance sensor comprises a left and a right optical system separated by a horizontal base length. It goes without saying, however, that the two optical systems may be arranged vertically or slantwise, with the base line thereof lying vertically or slantwise. Such geometry may be adopted substantially with the same meritorious effects as above. Further, it is noted that although separate left and right image sensors are utilized in the above embodiment, a signal image sensor may be utilized by dividing its pixel array into a left and a right region.

What is claimed is:

1. A distance sensor for measuring a distance to a moving object, the sensor comprising:
   two-dimensional image sensor means;
   optical means for forming on said image sensor means a first and a second image of an object a distance to which is to be measured, wherein said first and second images are shifted from each other by a magnitude of shift corresponding to the distance to said object;
   display means, coupled to said image sensor means, for displaying at least one of the first and second images;
   window forming means which sets an initial window region within a screen of the image displayed on said display means, said initial window covering an image of the object;
   control means for sampling pixel signals of said image sensor means at a predetermined sampling period, successively adjusting at each sampling time point within said screen both a position and also a dimension of the window region in accordance with the sampled pixel signals, and at each sampling time point, based on an image within said window region, determining said magnitude of shift between the first and second images and, in accordance therewith, determining the distance to said object by means of the principle of triangulation.

2. A distance sensor as claimed in claim 1, wherein said control means adjusts at each sampling time point both the dimensions of the window region in inverse proportion to a detected change in measured distance to the object, and also the position of the window region within said screen at a location where an image within the window region at a preceding sampling point most closely corresponds to the same image within the adjusted window region.

3. A distance sensor as claimed in claim 2, wherein said control means selects at each sampling time point an enlarged region which enlarges the window region by a predetermined amount, shifts successively with respect to said enlarged region, one pixel at a time, the window region of the preceding sampling time point, calculates at each shift a sum of differences of the pixel signals, and selects a new current position of the window region at a location where said sum of the differences of the pixel signals is minimized.

4. A distance sensor as claimed in claim 1, wherein said control means, at each sampling time point, selects a comparison region within a screen other than that within which said window region is set, shifts one pixel at a time within said window region with respect to said comparison region, calculates at each shift a sum of the differences of the pixel signals, and determines an amount of shift where said sum of the differences of the pixel signals is minimized, said magnitude of shift between said first and second images being determined in accordance with said amount of shift where said sum is minimized.

5. A distance sensor as claimed in claim 1, wherein said image sensor means comprises a pair of two-dimensional image sensors separated from each other by a predetermined distance, and said optical means comprises a pair of optical systems separated by a base length equal to said predetermined distance.

6. A distance sensor as claimed in claim 3, wherein when, at a sampling time point t1, a difference between a maximum and a minimum of said sum of differences of pixel signals calculated at each shift is less than a predetermined level, said control means neglects pixel signals sampled at said time point t1, and, at a time point t2 succeeding said time point t1, selects a new window region in accordance with a window region selected at a latest sampling time point t0 before said time point t1 at which said difference between the maximum and the minimum of the sum of signals calculated at each shift is not less than said predetermined level.

7. A distance sensor as claimed in claim 6, wherein when said difference between the maximum and the minimum of the sum of pixel signals calculated at each shift is less than said predetermined level for a predetermined length of time, said control means releases the window region and stops determining the distance to the object.

* * * * *